(12) United States Patent
Ergezinger

(10) Patent No.: US 6,618,583 B1
(45) Date of Patent: Sep. 9, 2003

(54) METHOD AND DEVICE FOR CALCULATING CHARGES IN TELECOMMUNICATIONS NETWORKS

(75) Inventor: Siegfried Ergezinger, Mettmann (DE)

(73) Assignee: E-Plus Mobilfunk GmbH & Co. KG, Dusseldorf (DE)

(*) Notice: Subject to any disclaimer, the term of this patent is extended or adjusted under 35 U.S.C. 154(b) by 0 days.

(21) Appl. No.: 09/600,228

(22) PCT Filed: Jan. 26, 1998

(86) PCT No.: PCT/EP98/00419

§ 371 (c)(1),
(2), (4) Date: Aug. 28, 2000

(87) PCT Pub. No.: WO99/38313

PCT Pub. Date: Jul. 29, 1999

(51) Int. Cl.[7] ............................................. H04M 11/00
(52) U.S. Cl. ................. 455/406; 455/409; 379/114.01; 379/114.2
(58) Field of Search ................. 455/405, 406, 455/407, 408, 409, 456.1; 379/114.01, 114.15, 114.2, 114.28, 121.01, 130

(56) References Cited

U.S. PATENT DOCUMENTS

| | | | | |
|---|---|---|---|---|
| 5,359,642 A | | 10/1994 | Castro | 379/121 |
| 5,592,535 A | | 1/1997 | Klotz | 379/58 |
| 5,797,101 A | * | 8/1998 | Osmani et al. | 455/407 |
| 6,047,179 A | * | 4/2000 | Kirby | 455/406 |

FOREIGN PATENT DOCUMENTS

| | | |
|---|---|---|
| DE | 43 12 362 | 10/1994 |
| DE | 195 28 423 | 2/1997 |
| EP | 0 698 987 | 2/1996 |
| EP | 0 794 651 | 9/1997 |

* cited by examiner

Primary Examiner—Quochien Vuong
(74) Attorney, Agent, or Firm—Brinks Hofer Gilson & Lione

(57) ABSTRACT

A mobile radio networks (2) linked with fixed networks (1a, 1b) in each case at least one charge detection station (7) is switched in, over which the charges in the linked networks (1, 2) are detected, and that each subscriber end apparatus (8, 9 and 10, 11, respectively) communicates with an exchange center (5, 6) over a telecommunication connection (12, 13 and 14, respectively) and that for each connection from a subscriber register, which is emplaced for example in the mobile radio network (2), specific data of the subscriber end apparatus (8, 9 and 10, 11, respectively) are asked, which are included in the charge calculation, in which a connection from the fixed network (1) or the mobile radio network (2) which is not covered by a credit is prevented by the means that the transfer of the data to the charge detection station (7) and the demanding of the subscriber data from the data bank occurs already at the requesting of a connection, and that in the case of a lack of credit the build-up of the requested connection is omitted or a connection is established to the Customer Service Center, in which a fixed-network or mobile radio network call number allocated to the subscriber is entered as reference number in a data set.

12 Claims, 6 Drawing Sheets

METHOD AND DEVICE FOR CALCULATING CHARGES IN TELECOMMUNICATIONS NETWORKS

BACKGROUND OF THE INVENTION

The invention relates to a method for calculating charges in telecommunications networks.

Further, the invention relates to a device for executing the method according to the invention.

Methods for calculating charges in telecommunications networks are prior-known.

The object of our own European patent application 96199 966.8, not prior-published, is a method for feeding credit or rendering-usable a telephone card for at least one cellular phone, that can be used in a mobile radio network, possibly together with a fixed telephone network, in which the telephone card is not itself fed the credit, but is fed a stipulated value only in the network. The feeding of this telephone card can be performed in a services platform, for example a services platform for Intelligent Networks (IN), in a Service Mode such as VASS (Value Added Services System) or in the Mobile Switching Station (MSC). There the telephone card is fed via telephone by the customer himself over a special call number.

The non-prior published European patent application describes for this a stipulated process course and also a security checking which is carried out in different testing steps. The non-prior published process occurs with the aid of a credit card which is issued in cooperation with a third party who appears as issuer.

In the non-prior-published European patent application of our own there is furthermore described a device for the execution of the process there, which comprises a mobile telephone network, which cooperates if need be with a fixed telephone network, in which there are contained: Network Interface Manager (NIM), MSC, Home Location Register (HLR), Voicemail Service Center (VMSC), Short Message Service Center (SMSC), a services platform, for example, VASS, AdC with Green Card-Workaround (GC-WA), Customer Service Center (CSC), Base Station Controller (BSC), Base Transreceiver Station (BTS), Credit Card System, and at least one cellular phone with a telephone card which is to be made refeedable or reusable, possibly with inclusion of a fixed network telephone.

Furthermore, refeedable throw-away cards were appraised as state of the art in the specification of our own above-mentioned European patent application.

From EP 0 698 987 A2 and in GB-A-2 215 897 A there are likewise described processes for making telephone cards reusable.

U.S. Pat. No. 5,265,155 relates generally to a process for the prepayment of telecommunication charges.

In U.S. Pat. No. 5,592,535, there is prior-known a mobile radio network with a radio exchange center and a subscriber data file, by means of which incoming calls are selected of such mobile radio subscribers to which in each case a credit account is allocated and with, network elements of an intelligent network by means of which the selected call are exchanged (vermittled) and charged.

From DE-A-44 12 727 A1 there is prior-known a device for the calculating of charges in a mobile radio system. For the calculating of charges in such a mobile radio system, in which a plurality of mobile radio stations, base stations and mobile radio exchange stations are provided, the mobile radio exchange stations are connectable with a debit center. The debit center receives in each case pre-fed amounts from a banking institution from which charges can be debitted. In the claiming of services by the mobile station these amounts are booked. The pre-feeding occurs with use of an intelligent network, in which the debit center is constructed as part of a service control center and is connectable with transmission arrangements from a monetary institution, and in which the mobile radio exchange centers execute the functions of the service access exchange centers of the intelligent network.

DE-A-44 19 651 A1 likewise relates to a process and to a device for the calculating of charges for a connection sought by a subscriber over a mobile station in a cellular mobile radio network. There, in time context with the build-up, with the existence, and with the termination of the connection basic data which relate to origin and goal, type of service, beginning and end, are transferred from a mobile exchange center allocated in each case to the mobile station to a charge detection station. The charge detection station asks subscriber data from a data bank appropriate for the subscriber, these subscriber data containing information concerning the credit of the subscriber. In the charge detection center, during the connection charges to be debited are continuously calculated from the basic data and debited from the credit.

Underlying the invention is the problem of creating a process which permits in particular the simple use of all charging possibilities of the mobile radio fixed-network account from the fixed network and the mobile radio network.

Further underlying the invention is the challenge of creating a device for the implementation of the process of the invention.

SUMMARY OF THE INVENTION

The process of the invention is based on a charging by means of rechargeable pre-paid credit accounts, in the fixed network and in the mobile radio network, and it relates to a cost-effective execution of a fixed network/mobile radio integration. This integration occurs through the assigning of one or several mobile radio numbers to one and several fixed network call numbers.

A further advantage lies in the easy handling, and, namely, both from the viewpoint of the network operator, and also from the viewpoint of the end-customer.

A special advantage lies in the possibility of self-administration of the process by the customer, therefore, for example, in the rechargeability of his account and in the use of the service centers called upon. The allocation of the mobile radio and fixed network numbers, there, can be subjected to various time-wise allocation profiles and geographically conditioned by the mobility of the subscriber, therefore can be different according to place, time, and claimed end part. According to the invention, the call number allocation, and therewith the allocation profiles, can be altered and changed by the customer.

The telecommunication apparatuses do not need to be in the same telecommunication network in order to utilize the advantages of the telecommunication connections according to the invention, with which it must be a matter of at least two telecommunication apparatuses which are bound in each case in one telecommunication network and have at their disposal a connection to the particular communicating unit of the telecommunication network.

Insofar as in the application documents the term "telecommunication end apparatuses" is used, there are meant thereby commercially usual fixed network telephones, telefax apparatuses, mobile radio apparatuses, etc., as well as combinations of these end apparatuses.

By a telecommunication connection, there, is meant there a message connection between at least two points, which can be achieved both over a cable connection such as television cables, local cables, subscriber cables, district cables, garden cables, CATV cables, or over a cableless connection such as Group Special Mode (GSM) 900, GSM 18000, Digital Enhanced Cordless Telephone (DECT), Cordless Telephone System (CTS), radio relay connections, acoustic or optical signal transmission, or via a combination of these message connections.

Within this network interconnection, according to the invention, there is arranged at least one charge-detection station in the mobile radio network, and same is connected with the exchange center via a telecommunication connection.

In principle there suffices there the linking of a fixed network and of a mobile radio network over one, preferably over a large number of network connection points is possible. It is also possible to link the different networks with one another via network connection points in such manner that there occurs an integration of the network connecting points for all the traffic flows coming in question.

Each subscriber end apparatus communicates with an exchange center over one of the above-described telecommunication connections.

The fixed network may consist of one, two, or of a number of local networks which are coupled over a trunk connection.

For each connection, data are inquired from a subscriber register which is deposited in the mobile radio network, which data are relevant for the calculation of charges. It is possible with the aid of the process of the invention to use different charge models for different subscribers or groups of subscribers. The identification of the caller is made over the Mobile Subscriber Integrated Service Network (MSISDN).

A connection out of the fixed network or the mobile radio network that is not covered by a credit can be prevented with the process of the invention in a simple manner by the means that transmission of the data to the charge detection center and the request for the subscriber data from the data bank occur already when a connection is requested and that in the absence of credit, the setting up of the requested connection is omitted, or that a connection to the CSC is established.

The process of the invention can be applied alternatively to conventional charge determinations. Thus, for example, the network operator can give the individual subscribers the choice as to by which process the charges are to be handled. The process of the invention has, furthermore, the advantage that it uses essentially the structures of the existing mobile radio networks and of the fixed networks, and it requires only a slight additional expenditure.

Further, the process of the invention offers to every user of a subscriber network the free choice of a lasting presetting or also of an individual case. Each subscriber communication end apparatus that wants to establish a connection to a connection in another subscriber network, can carry this out with the aid of a connection network operator identification number, for example 01077.

In case a subscriber changes location, then the preselection lists and the appertaining profiles are, under some circumstances, no longer optimally fitting for a connection build-up from the new locality. The invention, therefore, provides that in the case of a location change or in the case of the first utilization with a telecommunication end apparatus executed in this manner, a report is issued to the mobile radio network. This report contains all the important data to make it possible to sent the incoming calls correctly to the subscriber. Thus, for example, it can be established with the aid of the Calling Line Identity (CLI) where the subscriber is located at the time this report is made. The information can be used to recheck the data sets in the data bank, and, if necessary, to calculate new preselection lists for the end apparatus.

If the subscriber should already have stopped at this location and have stored profiles that must be used as a basis for telephone traffic from the new location, then by automatic detection and adaptation an optimal constellation is created, from which the customer can again, without more expenditure, automatically build up the most favorable connection.

The self-administration can be represented as follows:

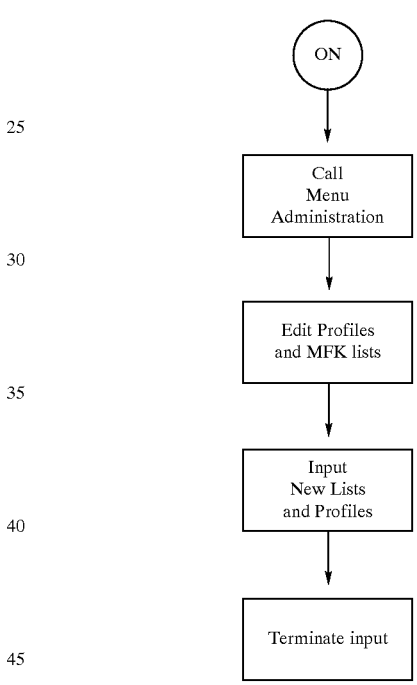

In accordance with the concept of this invention by which an automatic selection of the networks involved to achieve the most favorable constellation is made, Group Special Mobile (GSM), stored and forwarded to the subscriber's network, this invention is suited especially for the use of an integrated telecommunication apparatus, such as, for example, a DECT-GSM Dual Mode end apparatus. A connection between end apparatuses can be established via different paths. There are, in each case, other connecting networks involved. The processes and devices proposed here provide an automatic selection of the most favorable constellation of the networks involved for the customer at the time of the conversation build-up and the networks involved in this connection. For this the preselection numbers of the possible Long Distance Carrier (VNB) are downloaded into the end apparatus of the customer and stored. According to an algorithm, in the input of the preselection, there is sought the most favorable VNB correspondingly for this connection and the connection for this is formed with the desired target address to the target subscriber network.

A device for executing the inventive process has a telecommunication network having at least one mobile-radio and one fixed network that contains at least two communication end apparatuses. The end apparatuses are allocated to the telecommunication network. The device should also have an exchange center in the fixed network and several networking connecting points between the mobile-radio and the fixed network, as well as a charge detection station that is in one network and linked to the other. The charge detection station functions to administer the customer's account.

In another embodiment of the invention, the fixed network and/or the mobile network consist of two or more local networks and in which the fixed network and the mobile network are coupled by several networking connecting points. Also, at least one of the mobile radio networks has a charge detection station that is connected to an exchange station.

Other embodiments of the invention comprise a mobile radio network linked to a fixed network containing NIM, MSC, HLR, VMSC, SMCSC, a serial platform, for example Service Mode, AdC with GC-WA, CSC, BSC, BTS, Credit Card System, and at least one cellular phone which is provided with or without rechargeable or reusable telephone cards.

The invention is suited especially for the use of an integrated telecommunication end apparatus, such as, for example, a DECT-GSM Dual-Mode end apparatus. A connection between end apparatuses can be established over different paths. There are, in each case, other connecting networks involved.

The mobility can be represented as follows:

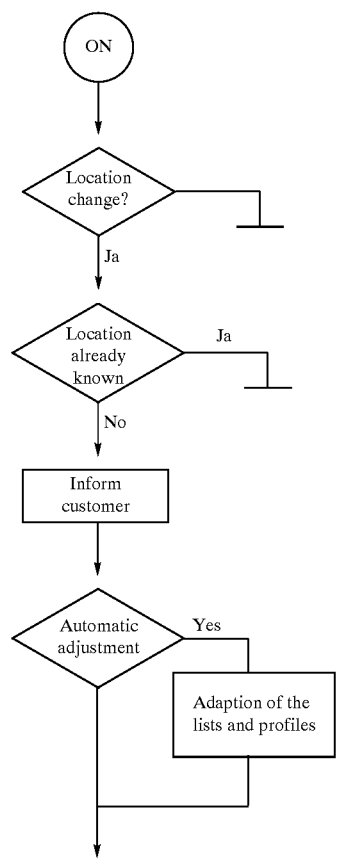

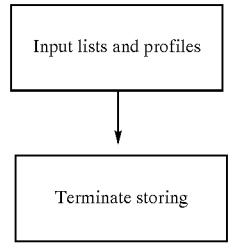

For the downloading of the preselection numbers for the telecommunication transmitting apparatuses there is provided, according to the invention, a data bank which can be implanted into one or several networks or network parts. Further, a computer must access this data bank if necessary and send the corresponding data to the subscriber over suitable transmission paths and thus actualize the data sets in the end apparatus. The transmission is possible, for example, via signaling systems such as SMA, Unstructured Supplementary Service Data (USSD), via data channels such as 9.6 kbit/s etc., as well as via Dual Tone Multi-Frequency (DTMF) tones. A precondition for this is that the end apparatus is conceived in such manner that an operation is possible both over the Local Carrier (TNB) network, and also over the VNB network. Such end apparatuses are already known and are designated as dual-mode end apparatuses or as multi-mode end apparatuses.

In the drawing the invention is illustrated with the aid of examples of execution-in-part schematically. In the drawing:

DETAILED DESCRIPTION OF THE INVENTION

Figure 1:
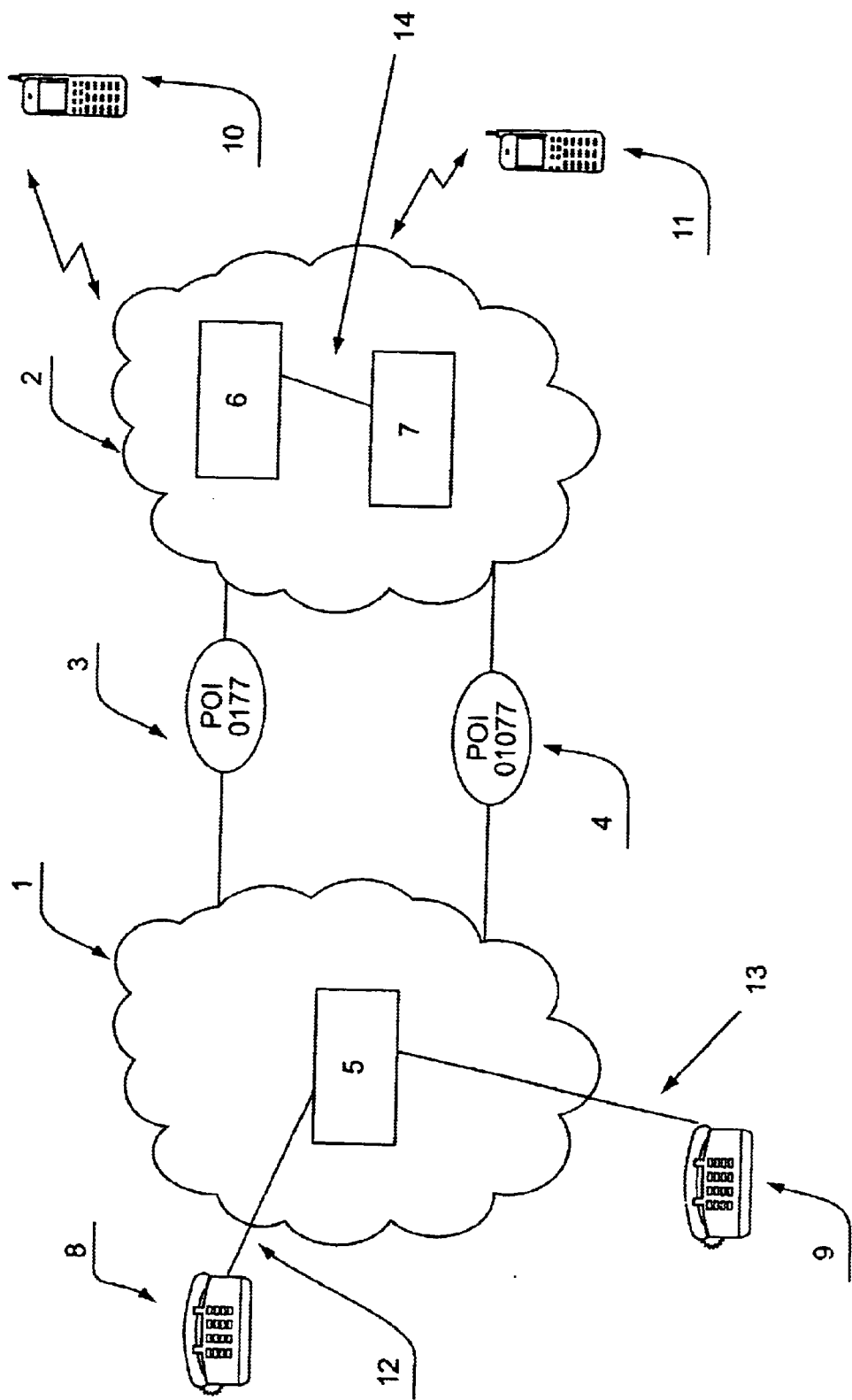
FIG. 1 shows a fixed network linked with a mobile radio network, in schematic representation.

In the form of execution according to FIG. 1 there is designated with the reference number 1 a schematically indicated fixed network, while 2 represents a mobile radio network.

The fixed network 1 and the mobile radio network 2 are linked with one another in the form of execution represented over two network connections 3 and 4. These network connections are also designated with Point of Interconnection (POI). The fixed network 1 and the mobile radio network 2 can, of course, be connected over a large number of such POIs, so that the different networks are linked with one another over POIs, so that there occurs an integration of the network connecting points for all traffic flows coming in question.

In the interest of clearer representation, in FIG. 1 for the fixed network 1 and for the mobile radio network 2 there is represented in each case only one exchange center 5 or 6, respectively.

The mobile radio network 2 has at its disposal, further, a charge detection station 7 for the execution of the process according to the invention.

Each subscriber end apparatus 8 or 9, respectively, of the fixed network 1, or 10 or 11 of the mobile radio network 2, communicates with one of the exchange centers 5 or 6 via a telecommunication connection 12 or 13, or on the radio path.

The charge detection unit 7 in the mobile radio network 2 is connected via a telecommunication connection 14 with the exchange center 6.

Figure 2:
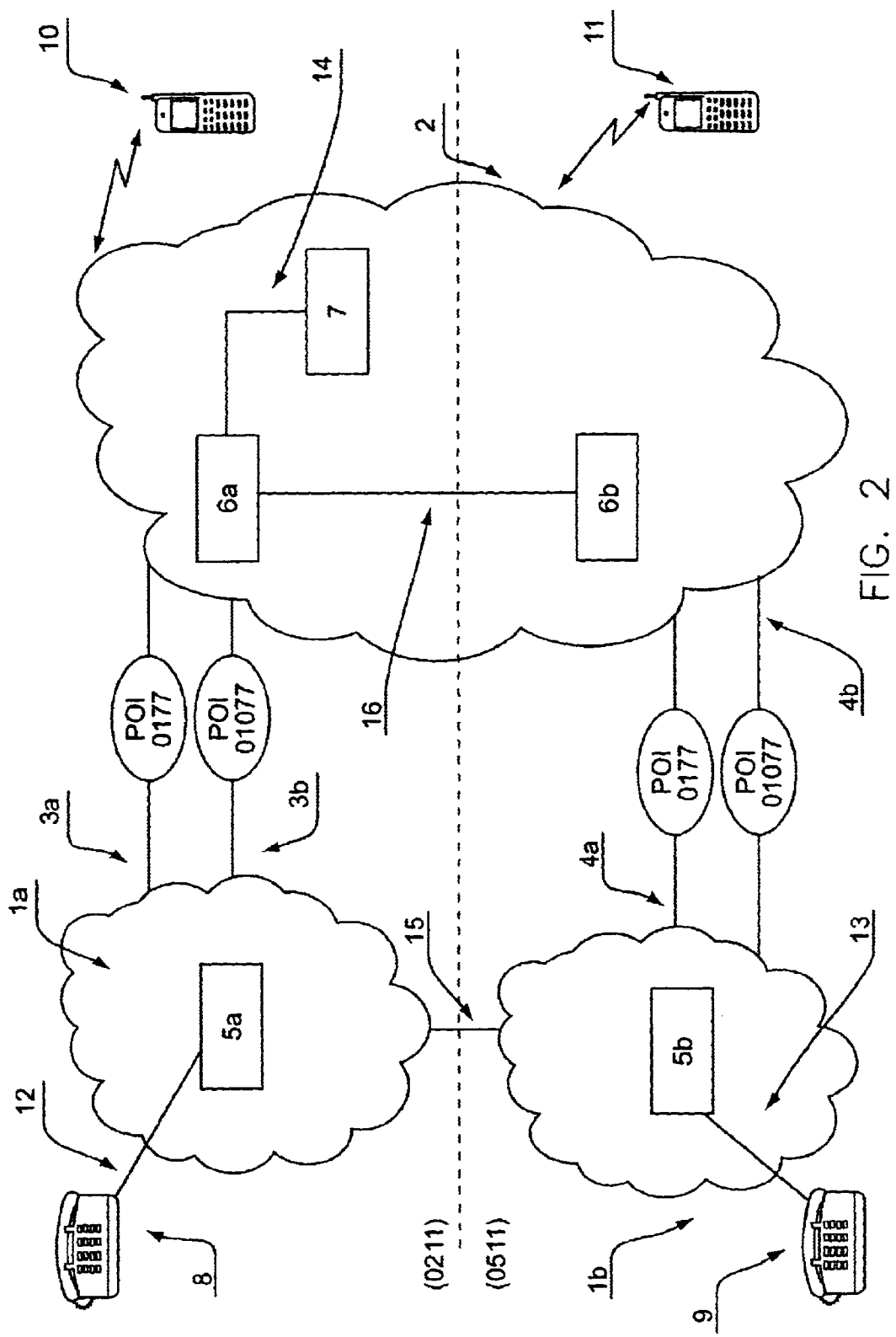
FIG. 2 is similar to FIG. 1 but having two fixed networks constructed as local networks, which are coupled over a trunk connection and which on their part are integrated with a mobile radio network via a telecommunication connection constructed as a message connection.

In the form of execution according to FIG. 2 the same reference numbers are used for parts of the same function. The fixed network consists in this case of the two local networks 1a and 1b, which are coupled over a trunk connection 15.

The local networks 1a and 1b can have different location preselections. The local network 1a is coupled with the mobile radio network 2 by the network connections 3a and 3b, respectively, and the local network 1b is coupled by means of the network connections 4a and 4b, respectively. For this reason there are represented altogether four POIs in FIG. 2, obviously also in this case the number of POIs can be considerably greater than is evident from FIG. 2.

The local networks 1a and 1b have exchange centers 5a and 5b, respectively, while the mobile radio network 2 has two exchange centers 6a and 6b, respectively, which are coupled with one another by a telecommunication connection 16. Instead of in each case two network connections 5a, 5b or 6a, 6b, the number of these network connection centers can also be smaller or considerably greater than represented.

From FIG. 2 it is further to be perceived that to the network connection center 6a of the mobile network 2 there is allocated a charge detection station 7, which again stands in connection over a telecommunication connection 14 with the allocated exchange center 6a. Obviously the number of charge detection stations can be greater than represented. For example, it is possible to provide such a charge detection station to the exchange center 6b.

From FIG. 2 it is to be learned that the mobile radio network 2 represents a connecting network, since in the represented form of execution it connects two telecommunication end apparatuses 10 and 11. It could of course also include a large number of telecommunication end apparatuses which in each case are connected to one of the subscriber networks. Each user of a telecommunication network has the opportunity to select the connection network operator over a lasting presetting or, in the individual case, also to select it freely.

Each subscriber communication end apparatus, 8, 9 or 10, 11, which wants to built up a connection to another subscriber network, can carry this out with the aid of a connection network operator identification number, for example 01077, (FIG. 2), while this connection network operator identification in the form of execution for example according to FIG. 1 is 0177.

For each connection, data is requested from a subscriber register that is implanted in the mobile radio network 2, which data are relevant for the charge calculation in the charge detection station 7. With the aid of the process of the invention it is possible to use different charge models as a basis for different subscribers or subscriber groups.

The self-administration already described at the outset allows the customer to change the allocation of the mobile radio or fixed network numbers over time and/or geographically, as conditioned by the mobility of the subscriber. There, both the call number allocation and also the allocation profiles can be changed and controlled by the customer. For this purpose there is allocated to each customer a data set which links one or more mobile radio call numbers with one or more fixed network call numbers. Moreover, a fixed network or mobile radio call number assigned to the subscriber is registered as a reference number. In this manner it is achieved that several call numbers from the mobile radio network 2 and from the fixed network 1 can use a common rechargeable credit account for prepaid telecommunication connections which is governed in the charge detection station 7. The call numbers can be stored in lists and can be altered, activated and deactivated at any time by the customer himself from the fixed network 1 or from the mobile radio network 2 in each case from his own or from a foreign telecommunication arrangement. The administration of these data can also be done from the fixed network 1 over a cost-free mobile radio number and/or over a corresponding service number. The customer's authorization can occur over a CLI and/or over a personal secret number (PIN).

Figure 3:
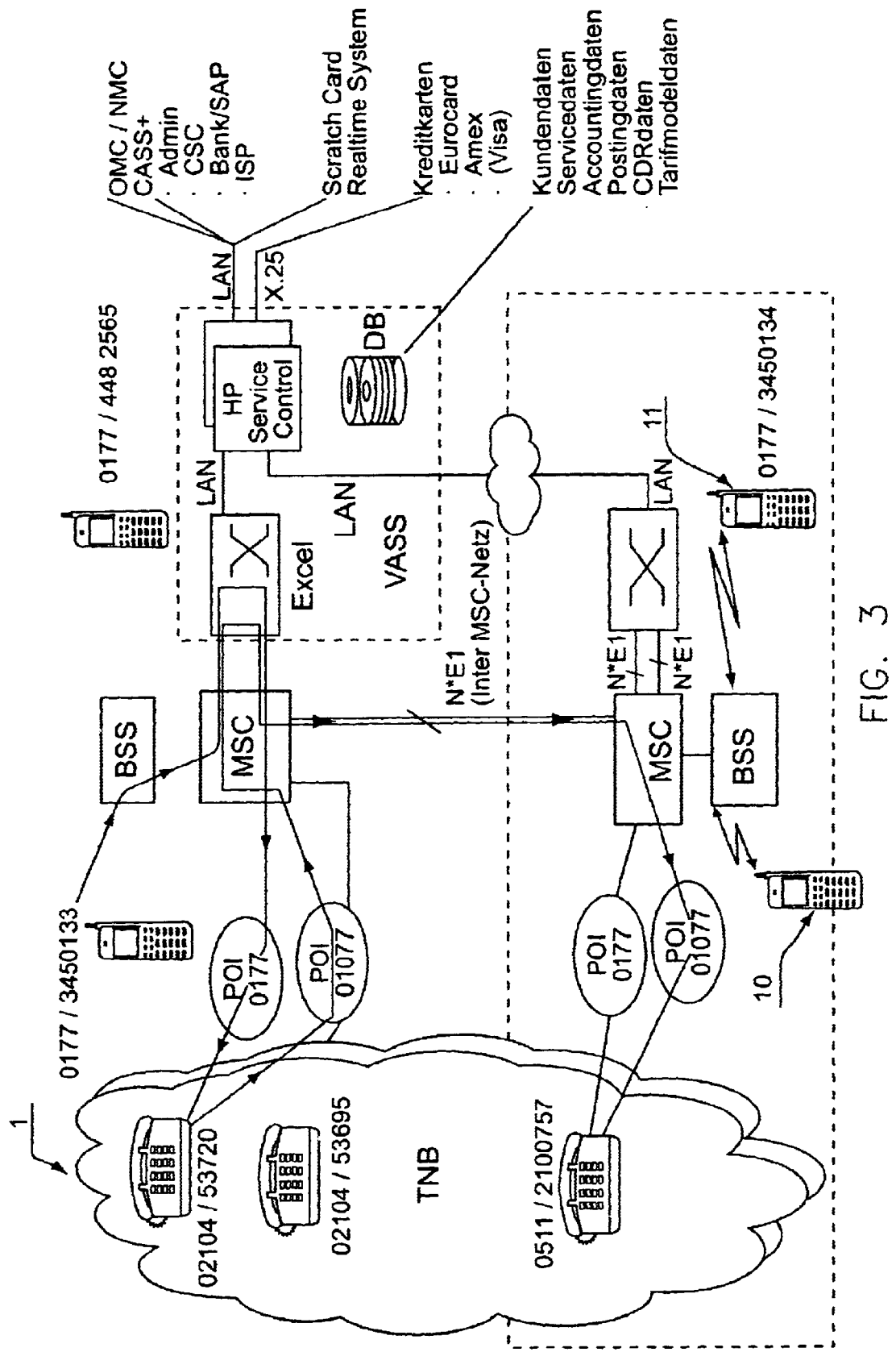
FIG. 3 shows a detail from a network.

FIG. 3 shows in schematic representation the linking of a fixed network 1 to the data administration or to the charge calculation.

Figure 4:
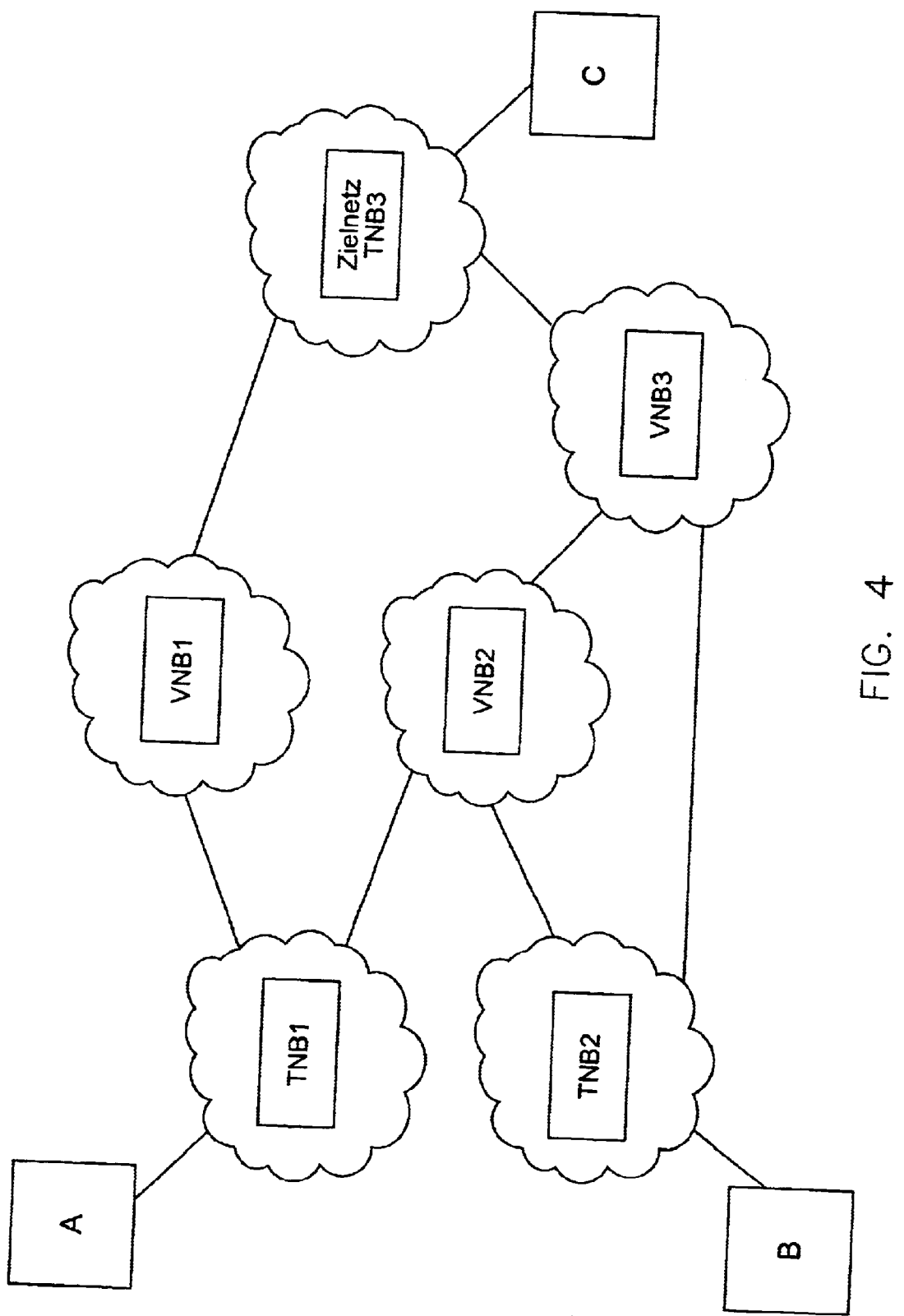
FIG. 4 discloses the use of integrated telecommunication end apparatuses.

In FIG. 4 there is illustrated the use of an integrated telecommunication apparatus such as, for example, a DECT-GSM Dual-Mode end apparatus. In FIG. 4 three such telecommunication transmitting apparatuses are represented and marked with the letters A, B and C.

The end apparatus A is connected to a Subscriber Network (TNB)1, end apparatus B is connected to a Subscriber Network TNB2 and end apparatus C to a Subscriber Network TNB3. These Subscriber Networks TNB1, TNB2 and TNB3 are linked with one another, for example, over Exchange Network Operators (VNH)1, VNB2 and VNB3. Here it can be a matter of fixed networks constructed as local networks and/or of mobile radio networks.

A connection between the end apparatus A and the end apparatus B or the end apparatus C can occur in various ways. There is in each case other connection networks involved. The process proposed here provides an automatic selection of the most favorable constellation of the networks involved at the time of the conversation build-up for the customer and for the networks involved in this connection. For this the preselection numbers of the possible VNB are downloaded and stored into the end apparatus of the customer. By an algorithm in the input of the preselection the VNB most favorable for this connection is correspondingly sought and the connection is forwarded to this with the desired target address with the target subscriber network.

Figure 5:
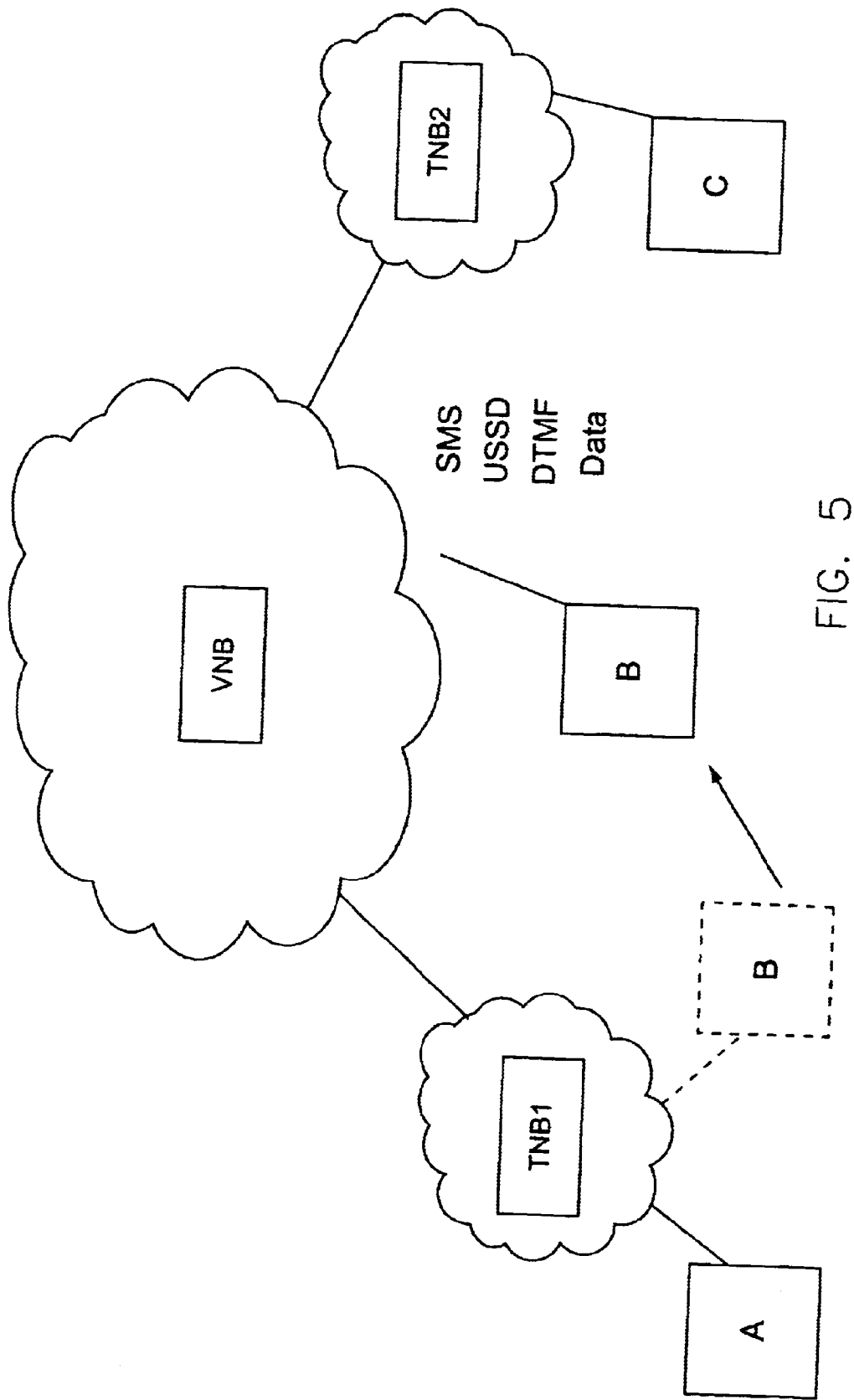
FIG. 5 illustrates the use of end apparatuses in the case of geographic relocation with use both in a TNB network as well as in a VNB network and FIG. 6 illustrates the location change of a subscriber.

For the downloading of the preselection numbers for the subscriber communication apparatuses A, B and C there is provided according to the invention a data bank system which can be implanted in one or several networks or network parts. Further, a computer must, if necessary, access this data bank and send the corresponding data to the subscriber over suitable transmission paths and in this way actualize the data sets in the end apparatus A, B or C. The transmission is possible, for example, over signaling systems such as Short Message Service (SMS), USSD, over data channels such as 9.6 kbit/s etc., as well as over DTMF-tones (FIG. 5). A precondition for this is that the end apparatus A, B or C is conceived in such manner that operating it is possible both over the TNB network and also over the VNB network. Such end apparatuses are already known and are designated as Dual-Mode end apparatuses or Multi-Mode end apparatuses.

Figure 6:
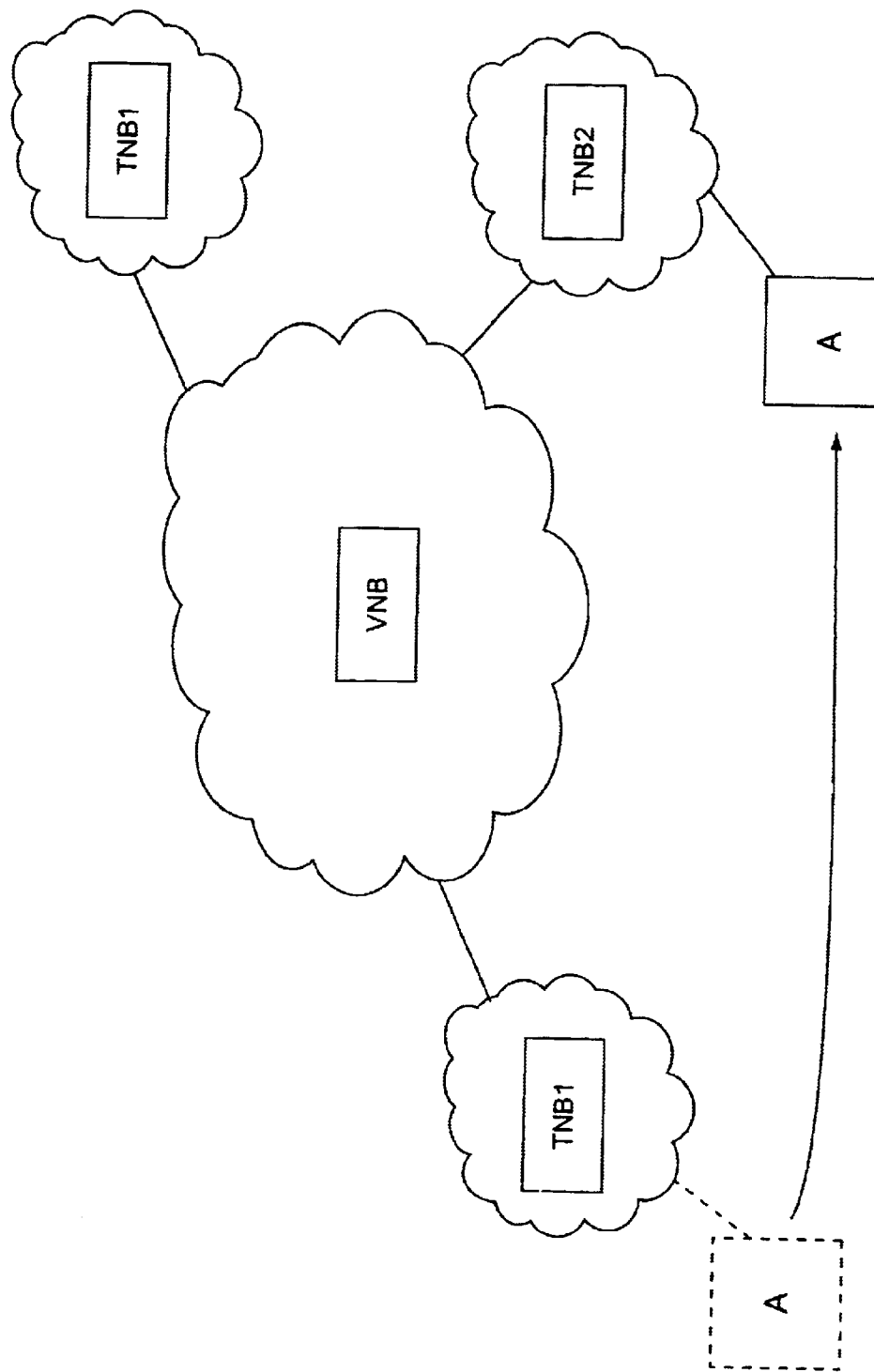

In FIG. 6 the location change of a subscriber is schematically represented. The subscriber A, originally arranged in TNB1, changes his location and is therewith supplied in TNB2.

Subscriber B is still arranged in TNB2.

The above-mentioned preselection lists and the allocation profiles belonging to them are no longer optimally adjusted for a connection build-up from the new locality. The invention, therefore, provides the following process.

First of all in the case of a location change with a telecommunication apparatus executed in this manner a report occurs to the mobile radio network. This report contains all the important data to make it possible to deliver incoming calls to the subscriber, in the present case A. Thus, for example, with the aid of the CLI it can be established where the subscriber is located at the time the report is made. The information can be used to recheck the data sets in the data bank and, if need be, to calculate new preselection lists for the end apparatus A. If the subscriber A should already have stopped in this location and have stored allocation profiles that must be used as the basis for telephone traffic from the new location, then by automatic detection and adaptation an optimal constellation is created, from which the end subscriber A can again build up the most favorable connection without more expenditure. The features to be seen described in the abstract, in, the patent claims, and in the specification, as well apparent from the drawing can be used both individually and also in arbitrary combinations for the accomplishment of the invention.

What is claimed is:

1. Method for calculating charges in telecommunication networks, comprising: calculating together telephone charges that accrue in a network concatenated from at least one fixed network (1) and from at least one mobile radio network (2) in a telecommunication connection between at least two telecommunication end apparatuses (8, 10), debiting the charges from at least one prepaid and rechargeable charge account in one or in several of the network, (1, 2) connected with one another, connecting the respective fixed networks (1) and the mobile radio networks (2) with one another over in each case at least one, preferably over several network connection points (POI), and that the connection of the subscriber end apparatuses (8, 9 and 10, 11, respectively) in each of the networks (1, 2) is carried out in each of the networks (1, 2) linked with one another over in each case at least one exchange center (5, 6), engaging at least one of the mobile radio networks (2) and the fixed networks (1a, 1b) with at least one charge detection station (7), over which the charges in the linked networks (1, 2) are detected, and each subscriber end apparatus (8, 9 and 10, 11, respectively) communicating with one of the exchange center units (5, 6) over a telecommunication connection (12, 13 or 14) and that for each connection, from a subscriber register which is included in the mobile radio network (2), determining specific data of the subscriber end apparatus (8, 9 and 10, 11, respectively) which are included in the charge calculation in which, from the fixed network (1) or from the mobile radio network (2) which is not covered, preventing a credit by means that the transmission of the data to the charge detection station (7), and that the requesting of the subscriber data from the data bank occurs already when he asks for a connection, and the should credit be lacking, at least one of omitting the building-up of the requested connection and establishing a connection to the CSC (Customer Service Center), in which case a fixed-network or mobile radio call number is registered as reference number in a data set; and wherein the call number allocation as well as allocation profiles are administered in a network-overlapping by the customer via self-administration, in which, for the purpose of self-administration, there is set by the customer, for every customer, a data set which links one another one or more mobile radio call numbers with one or more fixed network call numbers, in which the call numbers are stored in lists and altered, activated and deactivated by the customer himself from the fixed network (1) or from the mobile-radio network (2) in each case from his own or from a foreign telecommunication arrangement.

2. Method according to claim 1, further including allocating at least one of the mobile-radio and fixed network numbers to different allocation profiles conditioned in at least one of time and geographically by a mobility of the subscriber.

3. Method according to claim 1 or 2, characterized in that a user of an end apparatus (8, 9, 10, 11, A, B, C) selects the connection network operator (VNB) over a permanent presetting (Pre-Selection) freely and flexibly (Call by Call), in which each telecommunication end apparatus (8, 9, 10, 11, A, B, C) that wants to build up a connection for a connection in another subscriber network carries this out with the aid of a connection network operator identification number.

4. Method according to claim 1 or 2, characterized in that several call numbers from the mobile-network and from the fixed network (2 and 1, respectively) use a common, rechargeable credit account for prepaid telecommunication connections.

5. Method according to claim 1 or 2, characterized in that the administration of the data takes place over at least one of a cost-free mobile radio number and over a corresponding service number from the fixed network, while the authentication of the customer occurs over at least one of a CLI and a personal secret number (PIN).

6. Method according to claim 1 or 2, characterized in that for the charging of the mobile-radio network the following process steps are carried out:

a. for the charging of the mobile radio-fixed network account the customer selects from his end apparatus (cellular phone) a separate cost-free service number; thereby a connection is established to the corresponding system;

b. the customer selects per menu the point "charging via credit card";

c. the system informs the customer that he will carry out a charging up a certain amount, DM 100.00 or also other amounts, so that the announcement can be flexibly formed;

d. if through the actual charging exceeds of the maximal credit limit of the MFK to be charged, then the charge, if need be, is rejected;

e. the identification of the caller occurs over MSISDN, and the customer must give his secret number;

f. the customer makes the following inputs:
   credit card number
   expiration date of the credit card g. the system checks the allocation MSISDN and the credit card number;

h. if the checking is successful, the system switches into an authorization inquiry to the blocking data file (batch process); the blocking data file is brought up to date every day;

i. if the customer is not listed in the blocking data file, the charge detection station receives a clearance for the charging;

j. the system transfers the amount to the account of the rechargeable MFK of the customer;

k. as soon as the last input digit has been correctly input, the charging holds as conclusively initiated by the customer; the customer receives at the end of the conversation or later a report as to whether the charging was successful or not, for example:

1) your charging was successful; your credit amounts to xy DM; or
  2) your charging was not successful; your credit amounts to xy DM; or another announcement; if the customer does not hang up, he hears the announcement after the conversation; if he hangs up earlier or no longer has coverage, he hears the announcement in his next outgoing telephone call.

7. Method according to claim 1 or 2, characterized in that for the security check by the system the following process steps are carried out:

a) charging only from the cellular phone (identification of the telephone number MSISDN);
  b) input of the secret number;
  c) checking of the allocation MSISDN and credit card number;
  d) authorization online over the blocking data file.

8. Method according to claim 1 or 2, characterized in that an automatic selection of the connection is carried out at the time of the conversation build-up for the customer, and for the networks involved in this connection for the purpose of achieving the most favorable constellation, in such manner that the preselection numbers of the possible VNB are downloaded into the end apparatus of the customer and stored, wherein according to an algorithm, in the input of the preselection the most favorable VNB is correspondingly sought for this connection and the connection to this is forwarded with the desired target address to the desired target subscriber network.

9. Method according to claim 1 or 2, characterized in that for the charging of the fixed network the following process steps are carried out:

a. for the charging of the mobile radio-fixed network account (MFK) the customer selects from his end apparatus (fixed network telephone) a separate, charge-free service number; thereby a connection is established to the corresponding system;
  b. the customer selects per menu the point "Charging via credit card";
  c. the system informs the customer that he will carry out his charging up a certain amount so that the announcement can be flexibly formed;
  d. if through the actual charging there occurs an exceeding of the maximal credit limit of the MFK to be charged, then if need be, the charging is rejected;
  e. the identification of the caller occurs over MSISDN, and the customer must give his secret number;
  f. the customer makes the following inputs:
    credit card number
    expiration date of the credit card
  g. the system checks the allocation MSISDN and the credit card number;
  h. if the checking is successful, the system switiches into an authorization inquiry with the blocking data file (batch process); the blocking data file is brought up to date every day;
  i. if the customer is not listed in the blocking data file, the charge detection station receives a clearance for the charging;
  j. the system transfers the amount to the account of the rechargeable MFK of the customer; as soon as the last input digit has been correctly input, the charge holds as conclusively initiated by the customer; the customer receives at the end of the conversation or later a report as to whether the charging was successful or not:
    1) your charging was successful; your credit amounts to xy DM; or p2 2) your charging was not successful; your credit amounts to xy DM; or
      another announcement; if the customer does not hang up, he hears the announcement after the conversation; if he hangs up earlier or no longer has coverage, he hears the announcement in his next outgoing telephone call.

10. Method according to claim 1 or 2, wherein the at least one mobile-radio and one fixed network (2, 1), essentially contain at least two telephone communication end apparatuses (8, 9) which are allocated to the telecommunication networks (1, 2), with at least one exchange center (5) in the fixed network-mobile radio integration, at least one, preferably several network connection points (POI) between fixed network (1) and mobile radio network (2), at least one charge detection station (7) in one of the networks (1, 2) coupled with one another, in which for the particular customer an account rechargeable by said customer is administered, in which each subscriber end apparatus (8, 9, 10, 11) communicates with an exchange center (5, 6) over a telecommunication connection (12,13, 14).

11. Method according to claim 10, wherein at least one of the fixed network (1) and the mobile radio network (2) include two or more local networks (1a, 1b), in Which both the fixed networks (1) and also the mobile radio networks (2) are coupled with one another in each case by several network connection points (POI) and in at least the mobile radio network (2) there is arranged a charge detection station (7) which is connected to an exchange station (6a).

12. Method according to claim 10 wherein the mobile radio network (2) and the fixed network (1) which are linked with one another, contain essentially NIM, MSC, HLR, VMSC, SMCSC, a service platform, including a Service Mode, AdC with GcWA, CSC, BSC, BTS, credit card system (Credit Card System) and at least one cellular phone which is provided without or with rechargeable or reusable telephone card.

* * * * *

UNITED STATES PATENT AND TRADEMARK OFFICE
CERTIFICATE OF CORRECTION

PATENT NO. : 6,618,583 B1
DATED : September 9, 2003
INVENTOR(S) : Siegfried Ergezinger Page 1 of 1

It is certified that error appears in the above-identified patent and that said Letters Patent is hereby corrected as shown below:

Column 12,
Line 21, delete "p2" and start a new paragraph with -- 2) your --.
Line 41, delete " (12,13," and substitute -- (12, 13, -- in its place.
Line 44, delete "in which" and substitute -- in which -- in its place.

Signed and Sealed this

Thirteenth Day of April, 2004

JON W. DUDAS
*Acting Director of the United States Patent and Trademark Office*